United States Patent
Cazanas et al.

(10) Patent No.: US 9,173,133 B2
(45) Date of Patent: Oct. 27, 2015

(54) MOBILE DEVICE WITH GUARANTEED QOS

(71) Applicant: CELLCO PARTNERSHIP, Basking Ridge, NJ (US)

(72) Inventors: Carlos A. Cazanas, Bethlehem, PA (US); Kalpan S. Shah, Bridgewater, NJ (US); Phillip A. Leone, Frenchtown, NJ (US); Victor M. Pagan, Breinigsville, PA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/140,998

(22) Filed: Dec. 26, 2013

(65) Prior Publication Data

US 2015/0189552 A1    Jul. 2, 2015

(51) Int. Cl.
*H04W 80/10* (2009.01)
*H04W 28/18* (2009.01)
*H04L 29/06* (2006.01)

(52) U.S. Cl.
CPC .......... *H04W 28/18* (2013.01); *H04L 65/1006* (2013.01); *H04L 65/80* (2013.01); *H04W 80/10* (2013.01)

(58) Field of Classification Search
CPC . H04L 41/5067; H04L 65/1006; H04L 67/14; H04L 67/147; H04L 65/1106; H04L 65/80; H04M 15/66; H04W 28/18; H04W 64/00; H04W 80/10
See application file for complete search history.

(56) References Cited

U.S. PATENT DOCUMENTS

| | | | |
|---|---|---|---|
| 7,602,723 B2* | 10/2009 | Mandato et al. | 370/236 |
| 2010/0074109 A1* | 3/2010 | Klingenbrunn et al. | 370/230 |
| 2010/0115072 A1* | 5/2010 | Payyappilly et al. | 709/222 |
| 2010/0226488 A1* | 9/2010 | El Osta | 379/221.14 |
| 2010/0287285 A1* | 11/2010 | Castellanos Zamora et al. | 709/227 |
| 2012/0076218 A1* | 3/2012 | Ohara | 375/260 |
| 2012/0196566 A1* | 8/2012 | Lee et al. | 455/408 |
| 2013/0130642 A1* | 5/2013 | Joul et al. | 455/406 |
| 2013/0301481 A1* | 11/2013 | Inoue | 370/259 |
| 2014/0036666 A1* | 2/2014 | Sanda et al. | 370/230 |
| 2014/0140213 A1* | 5/2014 | Raleigh et al. | 370/235 |
| 2015/0009826 A1* | 1/2015 | Ma et al. | 370/235 |

* cited by examiner

*Primary Examiner* — Brian J Gillis
*Assistant Examiner* — Matthew Ballard

(57) ABSTRACT

A mobile device includes a transceiver that receives data from a network, and transmits data to the network, an input interface that receives input data from a user of the device, and a processor. The processor is configured to receive an input from the input interface indicating a desired quality of service (QoS) requested by the user for a communication session through the network. The processor is also configured to append a code corresponding to the desired QoS to a session initiation protocol (SIP) invite message relating to set-up of the communication session, and transmit the SIP invite message to the network by the transceiver to control the network to provide the desired QoS during communication between the mobile device and another device via the communication session through the network.

18 Claims, 7 Drawing Sheets

MOBILE DEVICE WITH GUARANTEED QOS

BACKGROUND

In recent years, mobile devices (e.g. smart phones) have increasing capabilities to perform phone calls, video conferencing, web surfing, video streaming, etc. With the increased popularity and capability of such devices has come increased demand for network communications services for mobile devices. To meet the actual and projected increases in demand, operators or carriers have continued to deploy upgrades of the relevant mobile communication network technologies. The current fourth generation (4G) mobile technology, referred to as Long Term Evolution (LTE) offers increased speed and traffic capacity and continues the evolution towards packet-based types of bearer transport for all or nearly all user communications.

With the deployment of 4G-LTE as the radio access network technology, the carriers have also deployed an Internet protocol (IP) multimedia subsystem (IMS) core network as an application layer to control and/or provide packet based multimedia services via the radio access networks. For example, servers on an IMS core network may provide the signaling and control functions to support voice calls and/or video calls that utilize IP packet communications to and from the mobile devices. A typical implementation of such call services may utilize session initiation protocol (SIP), e.g. for the relevant signaling communications.

Different types of communication through a 4G LTE network may receive and/or require different levels of quality of service (QoS). Message delivery (e.g. of email) or web page browsing, for example, may provide an adequate user experience even if the network only provides transport as a "best efforts" delivery service. By contrast, other applications like video or audio streaming or voice or video calls, have a real-time video delivery component, and tend to be more sensitive to delays and/or jitter; and the user experience for such services is enhanced when the network can provide packet delivery with appropriate QoS guarantees. In other situations, even if a low QoS might normally suffice, a user may want a faster/better service that effectively requires a better class or level of QoS than the network might normally or initially grant for a particular service (e.g. if the user wants faster web browsing than the network might normally offer).

In a conventional IP Multimedia Subsystem (IMS) network, QoS is dictated by an end user's data/voice plan with the network service provider. Generally, this QoS cannot be changed dynamically based on the end user's needs/preferences (i.e. a new service plan is needed).

BRIEF DESCRIPTION OF THE DRAWINGS

The figures depict one or more implementations in accordance with the present teachings, by way of example only, not by way of limitation. In the figures, like reference numerals refer to the same or similar elements.

DETAILED DESCRIPTION OF EXAMPLES

Figure 1:
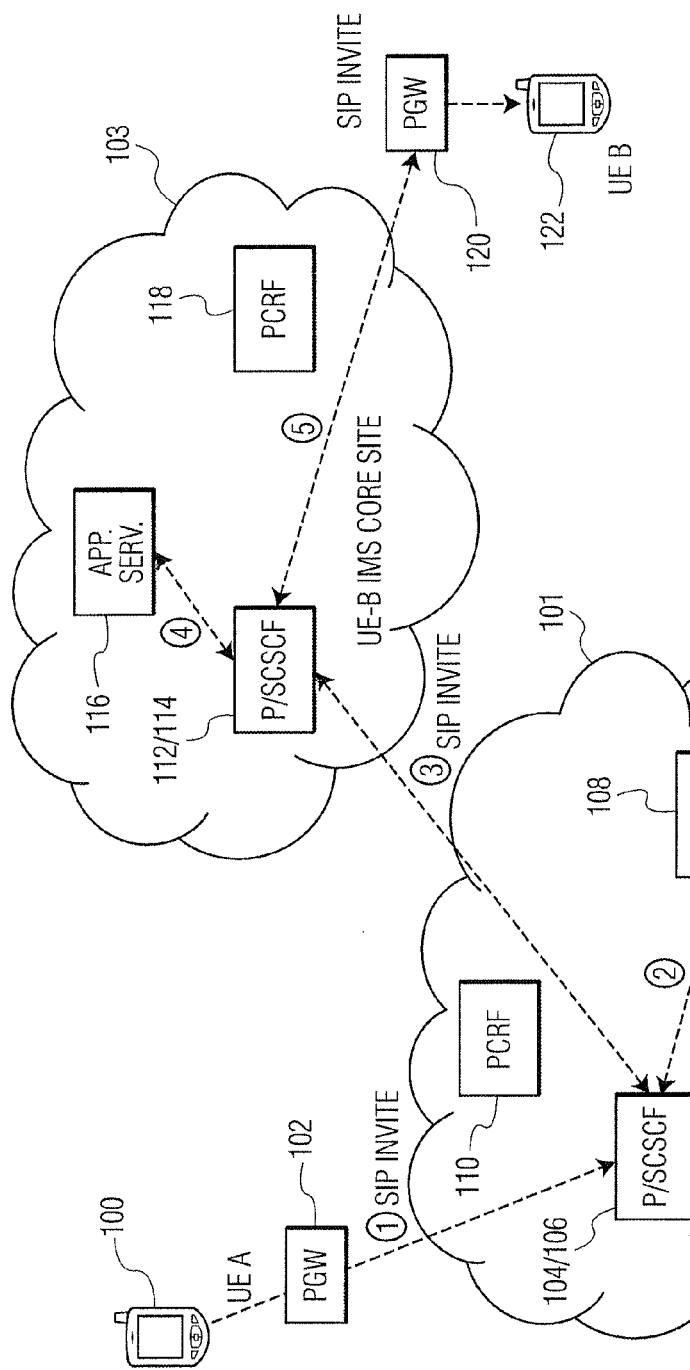
FIG. 1 shows a block diagram of mobile devices and network elements along with an overlay of invite messaging of an IMS mobile call.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A need exists to provide a mechanism in an IMS network that allows an end user (e.g. mobile device user) to dynamically control QoS for various applications on the UE device (e.g. mobile device). Dynamic control allows an end user and/or an application running on an UE device to manually/automatically control QoS both during and prior to execution of various applications such as video conferencing, video streaming, etc. in a desirable manner supporting the function(s) of the particular application.

In general, IMS is an architecture providing services to mobile users based on Internet protocols. IMS allows mobile end users to conduct simultaneous data, voice and other multimedia sessions. In an IMS system, session initiation protocol (SIP) is utilized as a signaling protocol to control the traffic flow through the network. SIP enables multiple users to communicate and establishes sessions between each other and various network devices.

In communication between end users, a particular end user is usually restricted to a QoS of a specific voice/data plan, where that user pays a monthly fee to a service provider. It may be beneficial, however, to allow the end user to control the QoS based on user's preferences or needs. For example, the end user may be a business person that is going to conduct an important video conference. Normally, the end user would not require a high QoS, but when an important video conference is scheduled, a higher QoS may be beneficial in providing higher quality video. In this situation, the end user may remotely request the service provider to increase the QoS for the particular video call (e.g., increase the overall bit rate to increase the video quality). After the video call has been executed, the QoS may revert back to the original QoS prior to the video call so that the user's data plan is not depleted.

In some examples, the user may manually select a desired QoS for a given application. However, in other examples the UE device may automatically select a QoS based on various parameters within the UE device and based on user preferences. For example, a third party application could be running on the mobile phone that monitors the user's preferences as well as battery life, data usage, etc., and thereby control the QoS in order to optimize these parameters. Rather than using a third party application, the mobile phone may also send the QoS request directly to the service provider through a service provider application.

In another example, the QoS may be selected for a certain time period or for a particular communication session. For example, a high QoS may be selected during the daytime (e.g., 9 am-5 pm business hours) when high QoS is desired. The QoS may then be decreased on nights and on weekends when high QoS may not be as desirable. The user may have various options for selecting a plurality of different QoS levels depending on the specific situation. Although, selecting QoS is described above with respect to mobile to mobile communication, it is noted that the selection of QoS may also be utilized when the mobile device is communicating with a server device. For example, when a mobile device is streaming video from a server, a specific QoS may be specified. The selection of QoS may also be utilized when a non-mobile user equipment (UE) device is communicating through a network that utilizes SIP signaling.

Figure 2:
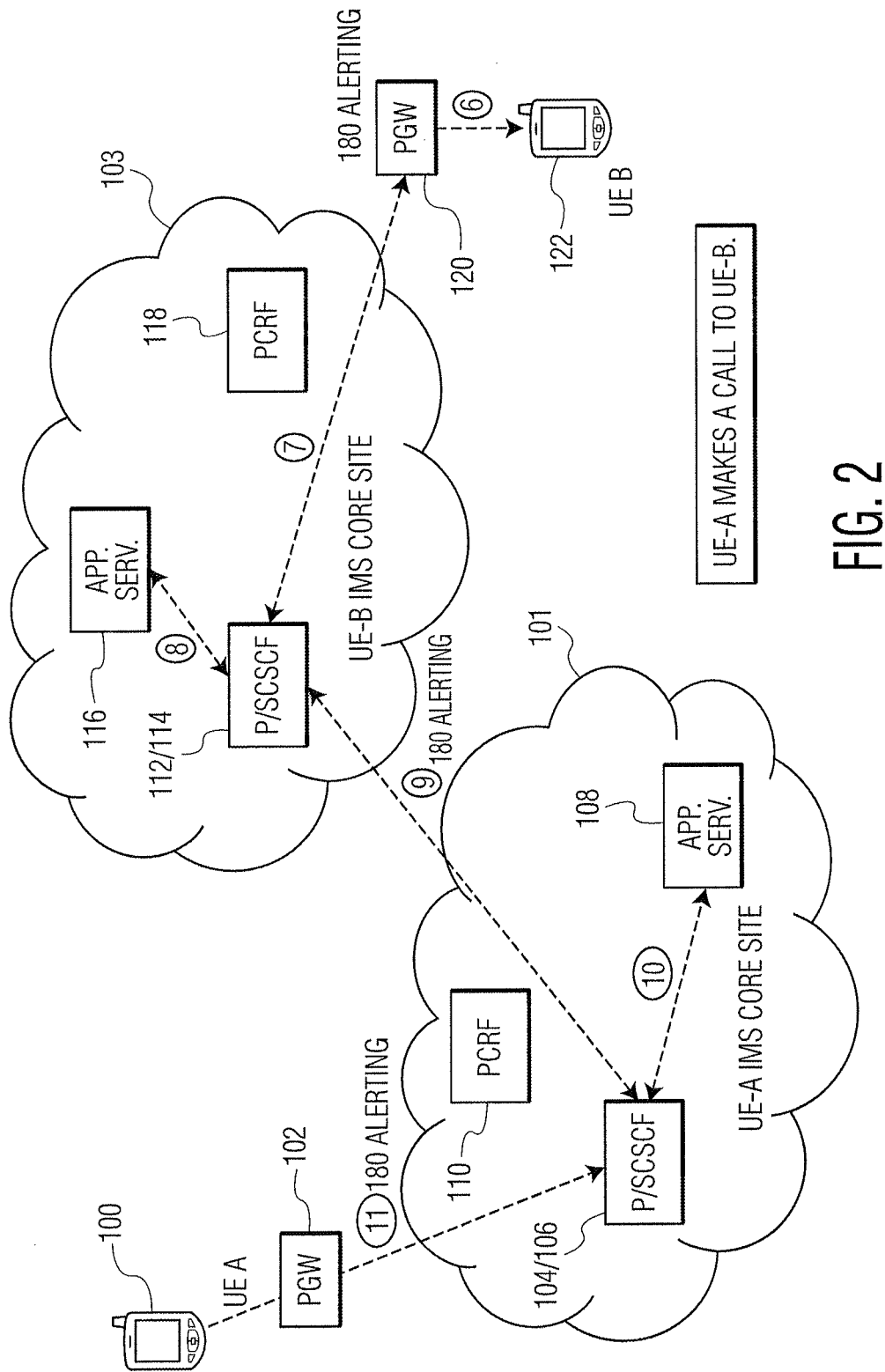
FIG. 2 shows a block diagram of mobile devices and network elements along with an overlay of alert messaging of an IMS mobile call.
Figure 3:
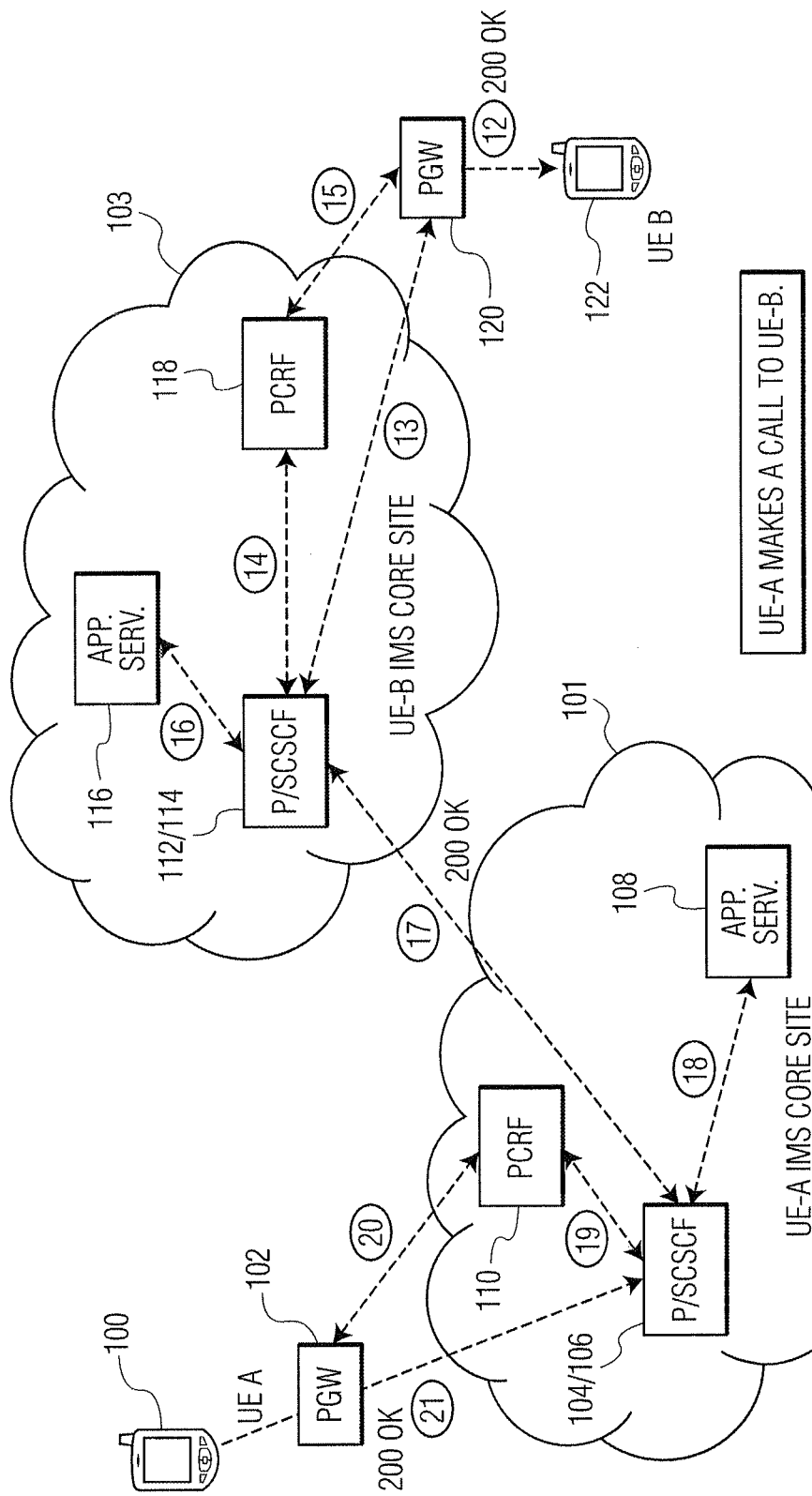
FIG. 3 shows a block diagram of mobile devices and network elements along with an overlay of acknowledgment messaging of an IMS mobile call.

As described above, a SIP is the signaling protocol utilized in IMS networks. Shown in FIGS. 1-3 are various signal messages that are sent back and forth between the end users and various hardware devices within the IMS networks to set up a mobile to mobile call. A general description of these components, and the signaling between these components will now follow, after which examples of call flows will be described in somewhat more detail.

FIGS. 1-3 show an IMS-to-IMS mobile call between end user devices UE devices 100 and 122. In general, UE devices 100 and 122 communicate with their respective networks 101 and 103 through a packet data network gateway (PGW) 102 and 120, respectively. The respective PGWs act as an interface between an LTE/Wifi network (not shown) and IMS networks 101 and 103. Also included in 101 is a proxy call session control function (P-CSCF) device 104 which acts as a SIP proxy server for network 101, server-CSCF (S-CSCF) device 106 which acts as a point of control in the network to control the sessions between the devices, application server (AS) 108 which provides applications to be executed by the mobile device, and policy control and changing rules function (PCRF) device 110 which is configured to control the charging/establishment of resources within network 101. Network 103 similarly includes a S-CSCF 112, P-CSCF 114 and AS 116. Network 103 also includes PCRF 118.

It is noted that although FIGS. 1-3 show these specific devices within the specific networks, that in different examples, different hardware devices may or may not be included within each network. It is also understood that although UE devices 100 and 122 are shown as mobile devices, these may include any devices capable of network communications. For example, they may include a corded or cordless telephone, cellphone, Smart phone, laptop computer, tablet computer, desk top computer or another type of computing or communications device. Each of the UE devices may also have separate numbers and are able to connect to one or more networks which may have different access technologies.

Networks 101 and 103 may include any type of network or combination of networks such as LAN, WLAN, WAN, WWAN, etc. Each of networks 101 and 103 may be capable to providing a variety of communication network services, such as registration services, authentication services, authorization services, call session control services and other types of communication services. Specifically, these networks may be configured to include IMS networks.

With reference to FIG. 1, mobile device 100 when attempting to call mobile device 122, may first communicate with PGW 102. In general, PGW 102 provides an interface between the LTE network utilized by mobile device 100 and the IMS network 101. Similarly, PGW 120 provides an interface between the LTE network of mobile device 122 and IMS network 103.

It should be noted that the various devices shown in FIGS. 1-3, PGW 102, PGW 120, P-CSCF 104, S-CSCF 106, AS 108, AS 116, S-CSCF 112, P-CSCF 114, PCRF 124, PCRF 110 may include one or more of a variety of computing and storage devices such as a computer, memory, a server, a cluster of servers or one or more of other types of computing or communication devices. In general, the access point to either IMS network 101, 103 is the P-CSCF 104 and 112, respectively. These act as a proxy server for the user devices 100 and 122, respectively. The S-CSCF 106 and 114 provides a point of control in the network that enables control of all service delivery and all sessions.

AS 108 and 116 may provide telepathy services that are not directly related to routing network messages. For example, the AS may provide services such as call waiting, call forwarding, call conferencing and other types of services.

PCRF 110 and 118 allow policy control decisions and flow based charging control functionalities to be accessed by P-CSCF 104 and P-CSCF 112, respectively.

When attempting to establish a call session using SIP signaling, (see FIGS. 1-3), the P-CSCF is typically the first point of contact that receives the SIP invite message. The P-CSCF then utilizes the S-CSCF in its own network to locate the S-CSCF in the recipient devices network.

In general, the invite message is forwarded from the initiating UE device 100 through to UE device 122 (see steps 1-5 in FIG. 1). Specifically, the user of mobile device 100 may initiate an application such as a video call. When initiating the video call, the user device 100 will send an instruction to PGW 102. The mobile device instruction will instruct the PGW to append a code onto the SIP invite message. This code corresponds to a desired QoS requested by the user of mobile device 100. In practice, the code may be manually entered by the user (e.g. numerical code *NNN), the code may be associated with an application (e.g. video call, regular phone call, other application, etc.) selected by the user, or the code may be associated with a QoS mode (e.g. low QoS, medium QoS or high QoS) selected by the user. In step 1, PGW 102 sends the SIP invite message (which includes the numerical QoS code) to P/SCSCF 104/106. In step 2, P/SCSCF 104/106 attempts to enable the application by sending the SIP invite to application server 108. The application server 108 extracts the numerical QoS code from the SIP message and compares the code to other codes stored in a database. Each of the codes stored in the database may be associated with a different QoS. When the received code matches a stored code, the desired QoS is determined. The application server 108 then instructs P/SCSCF 104/106 to demand the desired QoS from PCRF 110. See FIG. 3.

In step 3, the SIP invite is also sent to P/SCSCF 112/114 in network 103. In step 4, P/SCSCF 112/114 attempts to enable the application by sending the SIP invite to application server 116. The application server 116 extracts the numerical QoS code from the SIP message and compares the code to other codes stored in a database. In step 5, P/SCSCF 112/114 sends the SIP invite to PGW 120 and user device 122. This essentially completes the invite stage of setting up the session.

After the invite stage is complete, alerting messages (see steps 6-11 in FIG. 2) are then sent back from user device 122 to user device 100. Specifically, in step 6, mobile device 122 agrees to the video call to set up the session. In step 7, PGW 120 lets P/SCSCF 112/114 know that the session has been agreed to by mobile device 122. In step 8, the application server 116 is instructed of the session. In step 9, P/SCSCF 104/106 is notified of the agreement to the session. Finally, in steps 10 and 11, application server 108 and PGW 102 are also notified of the agreement to the session between the mobile devices 100, 122.

After the alert stage is complete, OK messages are sent back from user device 122 to user device 100 as shown in steps 12-21 of FIG. 3 to indicate that the session at the desired QoS has been established between application server 108 and application server 116 (i.e. the video call is established between mobile device 100 and 122 at the QoS desired by mobile device 100). In general, once these steps in FIGS. 1-3 are completed, an IMS-to-IMS mobile call is established.

Further details of SIP messaging are described in U.S. pub. no. 2013/0024574 entitled "Communication Session Allocation" to Lau et al. and U.S. pub. no. 2013/00190021 to Lau et al. entitled "Data Path Selection Method For Communication Session," which are incorporated herein by reference.

Figure 4A:
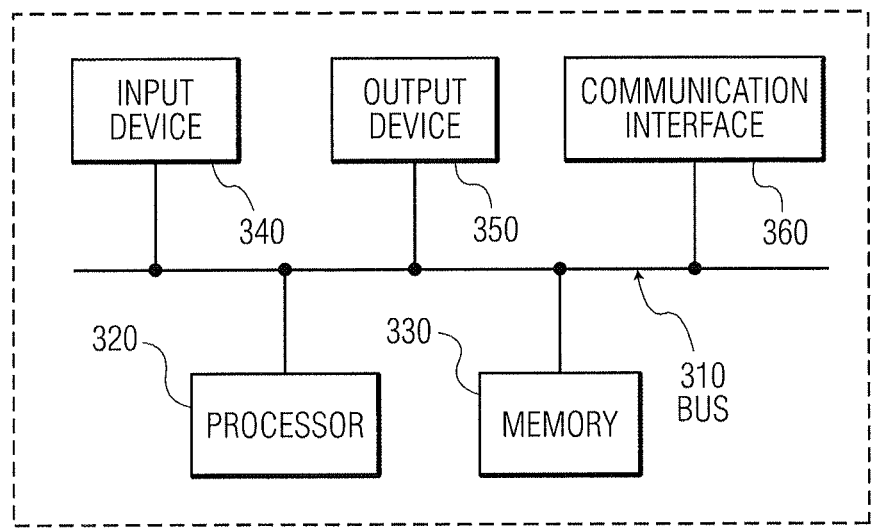
FIG. 4A shows a block diagram of a network device that may be used as one of the devices in FIGS. 1-3.

FIG. 4A is a diagram of example components of a device 300 that may operate within the environment shown in FIGS. 1-3. Device 300 may correspond to UE devices or other network devices such as Application Severs 108/116, P/SC-SCF 104/106, P/SCSCF 112/114, PCRF 110/118 and PGW 102/120, Each of these devices may include one or more devices 300 or one or more components of device 300.

As shown in FIG. 4A, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems and/or communication paths to enable communications among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

In one example, when device 300 is a mobile device of a mobile user, input device 340 may include one or more components that permit the user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) and/or optical signals. The communications interface 330 may additionally or alternatively support a wired connection, for example, an Ethernet connection to a wired portion of the network. The communication interface 360 may include multiple digital transceivers, for communicating with multiple access networks.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

In another example, device 300 may be application server 108 and/or 116. Upon receiving the QoS code from the P/SC-SCF via communication interface 360, processor 320 would compare the received QoS code with other QoS codes stored in a database in memory 330. Each of the stored QoS codes may be associated with a desired QoS indicator also stored in memory 330. If a match between the received QoS code and one of the stored QoS code is found, then the QoS value associated with the matched code is used as the desired QoS requested by the mobile user.

Figure 4B:
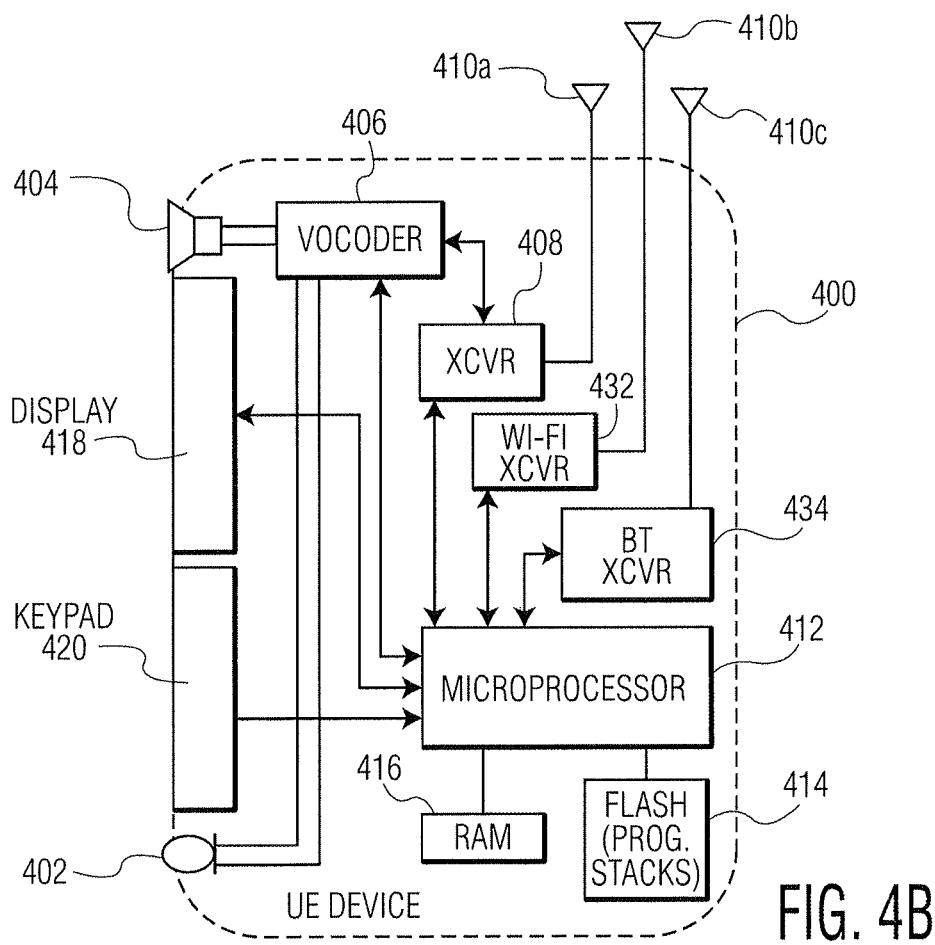
FIG. 4B shows a block diagram of an example mobile device.

FIG. 4B is a block diagram illustration of examples of mobile type UE devices 100 and 122. Although each of the UE devices may be a smart-phone or may be incorporated into another device, such as a personal digital assistant (PDA) or the like, for discussion purposes, the illustration shows the UE devices in the form of a handset. Each of the devices includes a call interface by which calls to other devices may be made and received, a network interface by which communications can be established with other local UE devices and a short-range communications interface by which communications with short range devices, such as a cordless headset, may be established.

The handset embodiment of the UE device 400 functions as a normal digital wireless telephone station. For that function, the station 400 includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (e.g., Internet Protocol) communications.

For digital communications, the handset 13a also includes at least one digital transceiver (XCVR) 408, an optional wireless network transceiver 432 and a short-range transceiver 434. For purposes of illustration, the wireless network transceiver 432 is shown as a Wi-Fi transceiver and the short-range transceiver 434 as a Bluetooth transceiver. Although not shown, the mobile station 400 may also be capable of analog operation via a legacy network technology. The device may also include a wired digital connection in addition to or in place of the digital transceiver 408. The digital transceiver 408 or wired connection is the call interface through which call data are received by the processor 412. The device 400 may not include a wireless network transceiver 432 and the transceiver 408 may be the network interface as well as the call interface.

The transceiver 408 provides two-way communication of information, such as vocoded speech samples and/or digital information, in accordance with the technology of the network environments 101 and 103. The transceiver 408 also sends and receives a variety of signaling messages in support of the various voice and data services provided via the UE device 400 and the communication network. Each transceiver 408, 432 and 434 connects through radio frequency (RF) send and receive amplifiers (not separately shown) to a respective antenna 410*a*, 410*b* and 410*c*. It is contemplated, however, that one or more of these antennas may be shared by multiple transceivers The transceiver 408 may also support various types of mobile messaging services, such as short message service (SMS), enhanced messaging service (EMS) and/or multimedia messaging service (MMS). It is contemplated that one or more of the antennas may be replaced by a digital wired connection.

The example UE device 400 includes a display 418 for displaying messages, menus or the like, call related information dialed by the user, calling party numbers, etc. A keypad 420 enables dialing digits for voice and/or data calls as well as generating selection inputs, for example, as may be keyed-in by the user based on a displayed menu or as a cursor control and selection of a highlighted item on a displayed screen. The display 418 and keypad 420 are the physical elements providing a textual or graphical user interface. Various combinations of the keypad 420, display 418, microphone 402 and speaker 404 may be used as the physical input output elements of the graphical user interface (GUI), for multimedia (e.g., audio and/or video) communications. Of course other user interface elements may be used, such as a trackball or other pointing device (not shown), as in some types of PDAs or smart phones.

In addition to normal telephone and data communication related input/output (including message input and message display functions), the user interface elements also may be used for display of menus and other information to the user and user input of selections.

A microprocessor 412 serves as a programmable controller for the UE device 400, in that it controls all operations of the UE device 400 in accordance with programming that it executes, for all normal operations, and for operations involved in the location procedure under consideration here and any location or event related communications. In the example, the UE device 400 includes flash type program memory 414, for storage of various "software" or "firmware" program routines and mobile configuration settings, such as mobile directory number (MDN) and/or mobile identification number (MIN), etc. The UE device 400 may also include a non-volatile random access memory (RAM) 416 for a working data processing memory. Of course, other storage devices or configurations may be added to or substituted for those in the example. In a present implementation, the flash type program memory 414 stores firmware such as a boot routine, device driver software, an operating system, call processing software and vocoder control software, and any of a wide variety of other applications, such as client browser software and short message service software. The memories 414 and 416 also store various data, such as telephone numbers and server addresses, downloaded data such as multimedia content, and various data input by the user. Programming stored in the flash type program memory 414, sometimes referred to as "firmware," is loaded into and executed by the microprocessor 412. Although the microprocessor 412 and memories 414 and 416 are shown as being internal to the UE device 400, it is contemplated that it may be external to the device as may the transceivers 432 and 434.

As outlined above, the UE device 400 includes a processor, and programming stored in the flash memory 414 configures the processor so that the UE device is capable of performing various desired functions, including in this case the functions involved in the location technique and any associated events.

As described above, when initiating the call routing between UE devices 100 and 128, CSCF call routing is performed as shown in FIGS. 1-3 where various signals are sent back and forth through the network between mobile devices. When a user wants to request a desired QoS in a mobile to mobile call, the user may be able to enter an alphanumerical character code that is associated with the desired QoS. These numerical codes may be known to the user through an application running on the phone which provides various options for selecting desired QoS levels for communication sessions.

For example, a third party application may provide a user with three QoS options (low QoS, medium QoS, and high QoS). Each of these QoS options may be associated with a numerical code such as low=001, medium=002 and high=003. This allows a user to enter the numerical code when setting up the call between the mobile devices.

In other examples, the numerical code is not manually input by the user of the mobile device. In one example, the numerical code may be associated with a particular application selected by the user. Thus, when the user selects this application (e.g. video call), a numerical code associated with the application is automatically utilized. In another example, the numerical code may be associated with a QoS mode selected by the user. Thus, when the user selects a QoS mode from a number of displayed options (e.g. low, medium and high), the numerical code associated with the selected mode is automatically utilized. In these last two examples, the user does not actually input the code, but rather the code is input to the SIP signaling by the mobile user device automatically.

It should be noted that the numerical code could also be selected by an application running on the users phone or by the service provider that adjusts the user QoS dynamically based on data usage, battery usage, time of day, day of week and many other factors. In one example, when battery life is low on the mobile device, the system may automatically reduce QoS such that processing in the mobile device will be reduced, and therefore battery life will be maintained longer. In another example, when a user has come close to reaching the maximum of his monthly data plan, the system will automatically reduce the QoS (e.g. the bit rate), and therefore the user will be less likely to exceed the data plan usage for the month. In yet another example, when the system detects a time of day/week (e.g. weekends) when the user does not need high QoS, or when the network is bogged down with high traffic, the system may automatically reduce the QoS on a number of mobile devise to save network resources.

With both manual and automatic control over QoS, it is contemplated that there may be a contradiction between what the user requests, and what the system automatically determines. In this scenario, certain rules may be predetermined on the mobile device which allow the user to override the automatic system, or allow the system to override the manual selection by the user. These rules will be set up by the system and agreed to by the user or vice versa. In either case, the contradiction will be governed by the rules set forth by the system/user. For example, a rule may allow the system to automatically set the QoS unless the user requests a different QoS (i.e. the user can manually override the QoS determined by the system).

Figure 5:
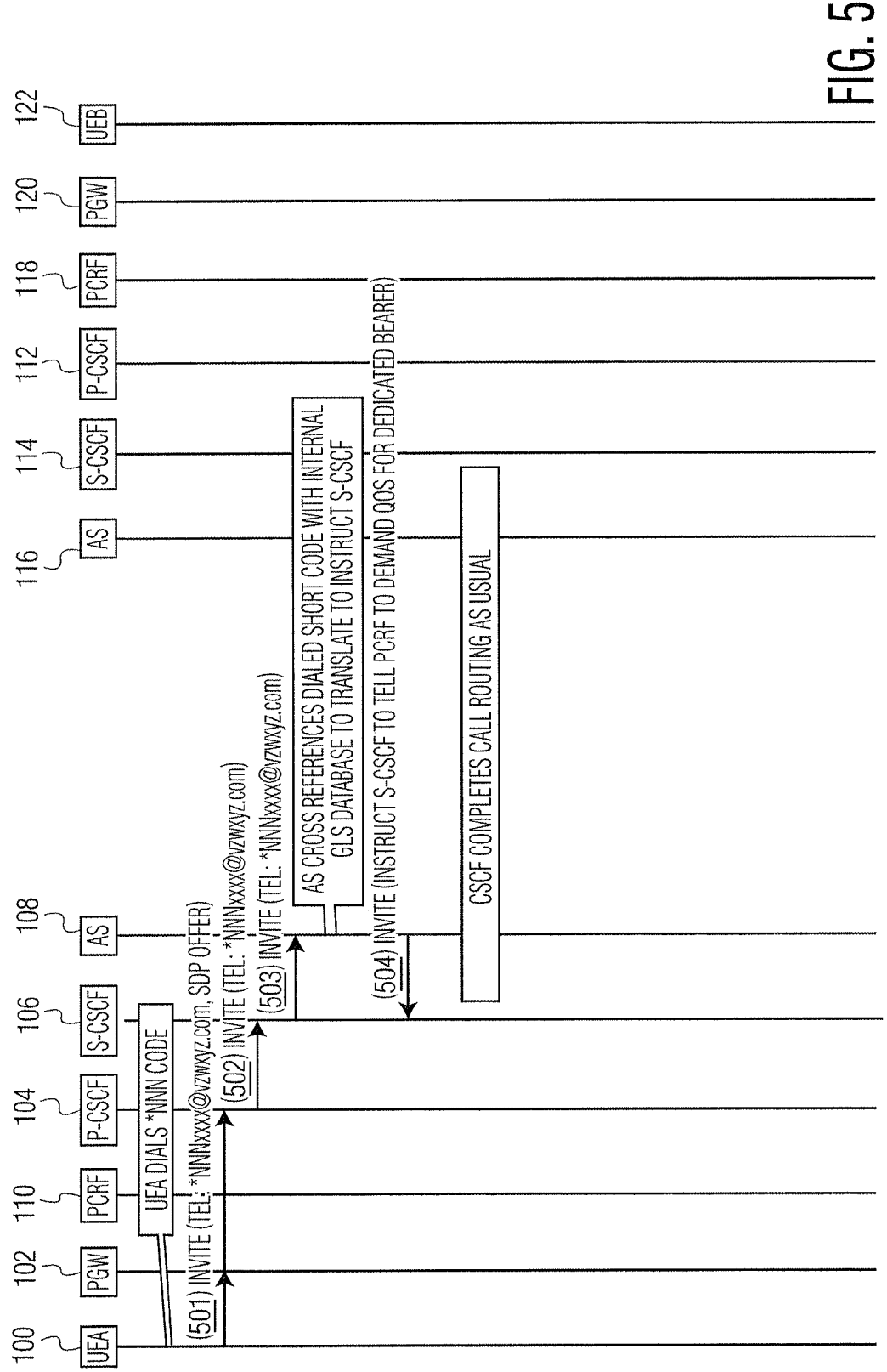
FIG. 5 shows a flow chart for requesting QoS before making a call.
Figure 6:
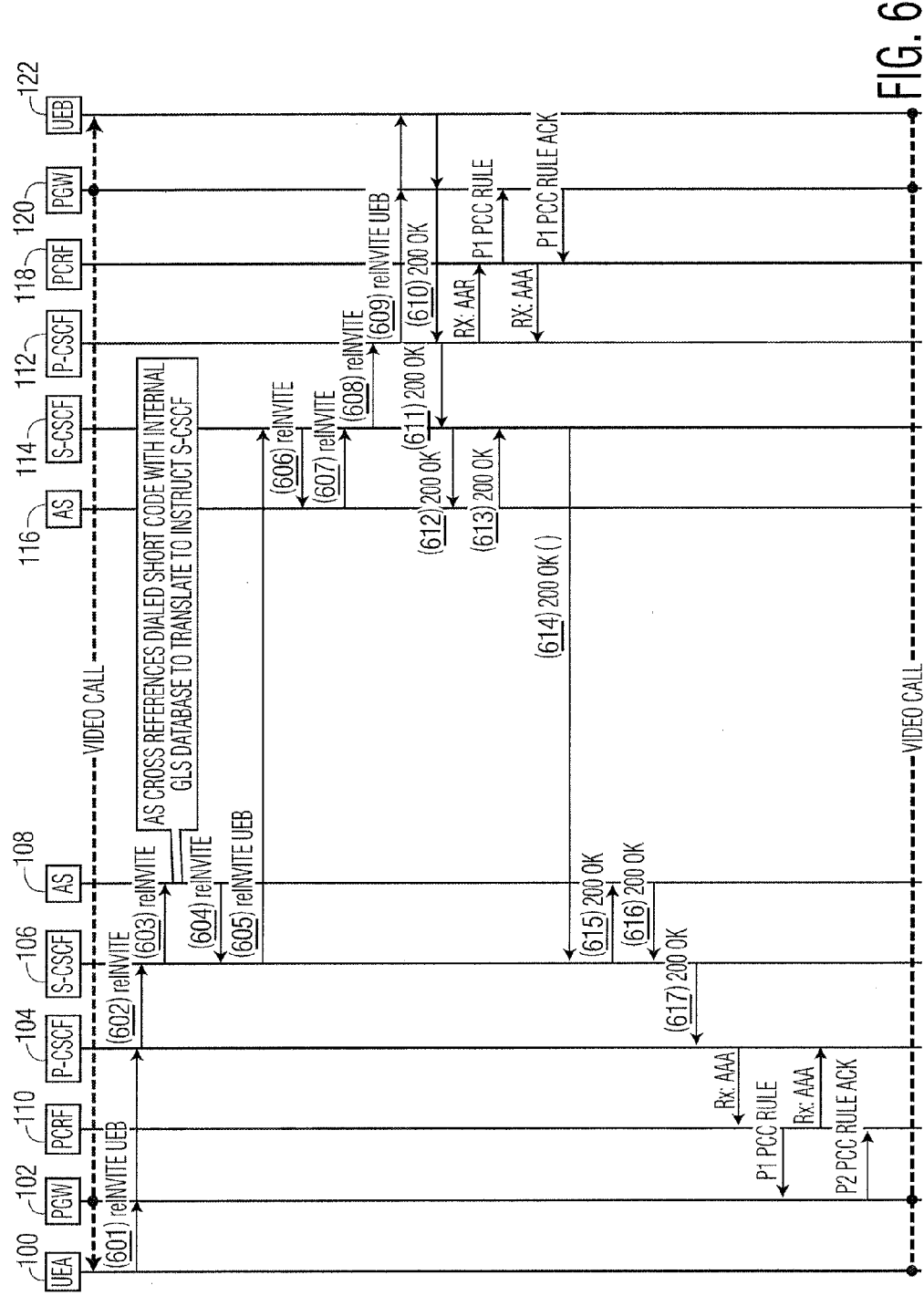
FIG. 6 shows a flow chart for requesting QoS during a call.
Figure 7:
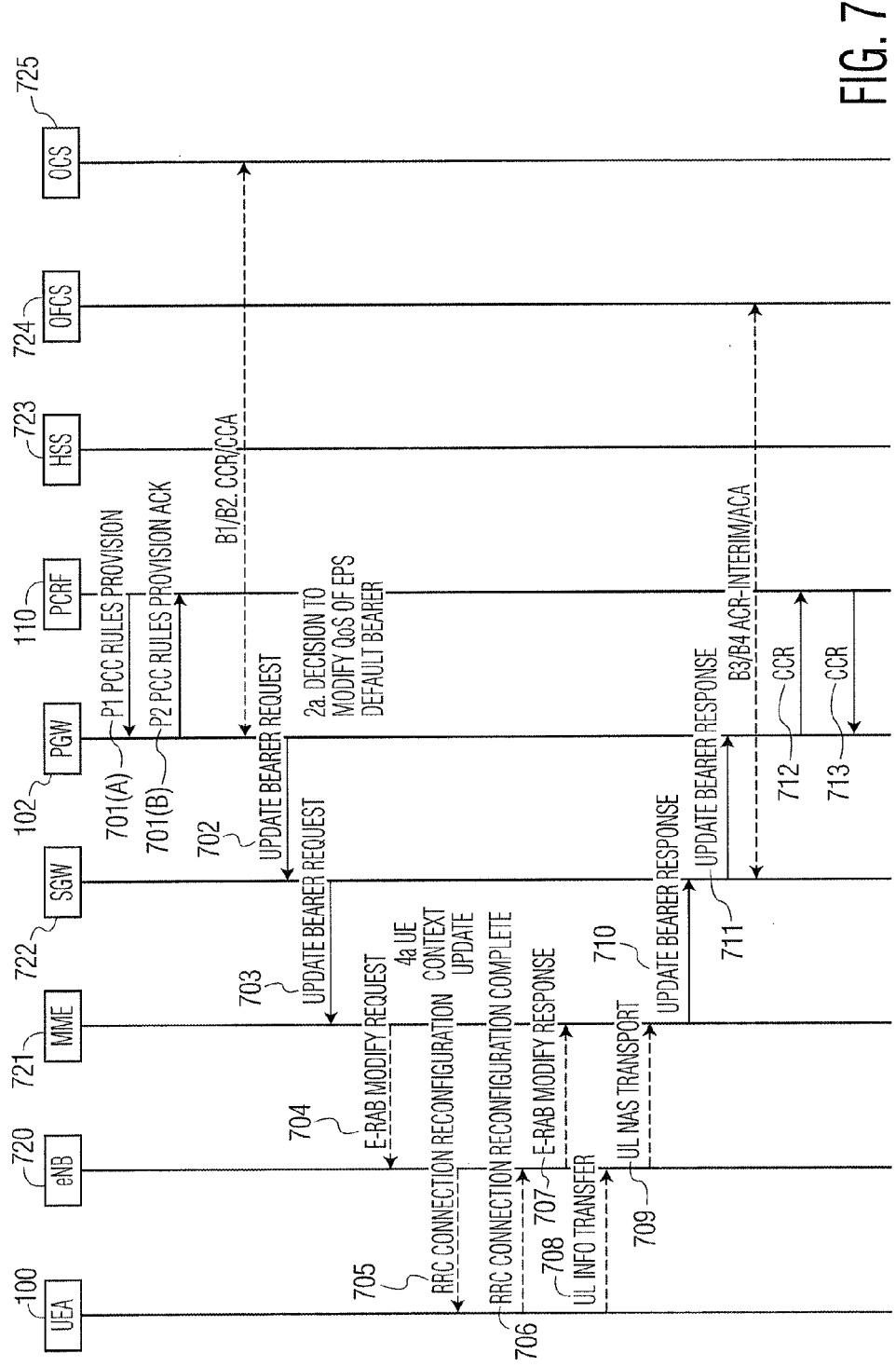
FIG. 7 shows another flow chart for requesting QoS during a call.

This general mechanism for selecting desired QoS using a numerical code is shown in signaling FIGS. 5-7, where the numerical code is included in the SIP signaling to set up the mobile call.

For example, as shown in FIG. 5, UE 100 may dial UE 122's phone number and enter a three digit number *NNN (although any number of digits and alphanumerical characters can be utilized) which specifies a desired QoS level. In one example, the three digit number can be entered prior to, or after the phone number is entered into the phone, and prior to hitting the send button. In another example, the user may hit a button on an application that specifies a level of QoS. In this example, the QoS code *NNN would be automatically generated by the mobile device based on the user selection of a particular application or based on other factors described above. The QoS code is then appended to the SIP invite message from the PGW to the P-CSCF (see step 501). The QoS code is then passed through network 101 to S-CSCF 106 (see step 502), to AS 108 (see step 503) and then back from AS 108 to S-CSCF 106 (see step 504).

In general, AS 108 compares the received QoS code to a plurality of other QoS codes stored in a database. Each of the stored QoS codes is associated with a desired QoS. Once AS 108 matches the received QoS code to a stored QoS code, it instructs S-CSCF to tell PCRF 110 to demand the QoS that is associated with the QoS code entered by the user (see step 504).

In general, the CSCF call routing operations will then be completed as described with reference to FIGS. 1-3 (i.e. the SIP invite message with the code is sent to AS 116, an alert is sent back from mobile device 122 to mobile device 100 indicating that the desired QoS has been agreed to, and finally OK messages are sent from mobile device 100 to mobile device 122 completing the set up of the session).

FIG. 5 shows a scenario where UE 100 requests a desired QoS prior to initiating the session (e.g. the video call) with UE 122. However, there may also be another scenario where UEs 100 and 122 are already communicating through a session (i.e., already on a video conference call). In this scenario, one of the end users may wish to increase or decrease the QoS level in the middle of the call.

A signaling scenario is shown in FIG. 6 where a re-invite (i.e. invite message in the middle of a session, when user presses *NNN number to get better QOS during the call) message is sent between UE device 100 and 122 to execute a bump (i.e. increase or decrease) in QoS during a video call. Specifically, a re-invite message is sent from UE 100 to P-CSCF 104 (step 601), from P-CSCF to S-CSCF (step 602), from S-CSCF 106 to AS 108 (step 603).

Similar to FIG. 5, AS 108 will try and match the received QoS code with a stored QoS code to determine the desired QoS of mobile user 100. If the codes do not match (i.e. the user entered an invalid code), an error message may be sent back to the user that tells the user that the code was invalid, and prompts the user to enter another valid code. If the codes match, AS 108 then instructs S-CSCF 106 to demand the desired QoS from the PCRF 110 (step 604), A SIP invite message with the code is then sent from S-CSCF 106 to S-CSCF 114 (step 605), and from S-CSCF 114 to AS 116 (step 606). AS 116 then sends the reinvite to S-CSCF 114 (step 607). Then S-CSCF 114 sends the reinvite to P-CSCF 112 (step 608) and then to PGW 120 and UE 122 (step 609).

Although not shown in FIG. 6, the re-invite message may also include the numerical QoS code that is entered by UE 100. In general, both PGWs 102 and 120 will agree on the desired QoS that is requested by UE 100. Thus, the numerical code for the QoS as shown in FIGS. 5 and 6 will be passed between PGW 102 and PGW 120 in order to set up the session at the desired QoS level.

Once UE 122 receives the re-invite message and agrees upon the desired QoS level, UE 122 then sends an OK message back to PGW 102 which acknowledges the acceptance of the QoS. Specifically, UE 122 sends a message to PGW 120 and to P-CSCF 114 (step 610). Step 610 may also include other received messages and acknowledgement messages that are passed between P-CSCF 114 and PGW 120 (e.g., RX:AAR, P1 PCC Rule, RX:AAA and P1 PCC Rule Ack). Then P-CSCF 112 sends an OK message to S-CSCF 114 (step 611). The OK message is then passed to AS 116, then to S-CSCF 114, then to S-CSCF 106, then to AS 108, then back to S-CSCF 106, and then to P-CSCF 104 (see steps 612, 613, 614, 615, 616 and 617). Once P-CSCF 104 receives the final OK that the UE 122 has agreed to the desired QoS, again various receive and acknowledgement messages may be transmitted between P-CSCF 104 and PGW 102 (e.g., RX:AAR, P1 PCC Rule, P2 PCC Rule Ack and RX:AAA). It should be noted that if UE 100 and 102 cannot agree on a QoS, then the lowest QoS may be selected for both, or different QoS levels may be selected for both devices.

Although not shown in FIG. 6, PCRF 110 and PCRF 118 are able to instruct PGW 102 and 120, respectively regarding the rule change. Details of these instructions are shown in FIG. 7. For example, the P1 PCC Rule provision and acknowledgement messages are sent back and forth between PCRF 110 and its respective PGW 102 (see steps 701(A) and 701(B)). An update bearer request message is then sent from PGW 102 to signaling gateway (SGW) 722 and then to mobility management entity (MME) 721 which is the control mode that processes the signaling between the UEA 100 and the network (see steps 702 and 703). A modified bearer request E-RAB is sent to the evolve node B (ENB) 720 which may be a base station for UEA 100 (see step 704). An RCC connection and reconfiguration message is then sent from the ENB 720 to UEA 100 and then back to the ENB 720 (see steps 705 and 706). Also a UL info transfer message is sent from UEA 100 to the ENB 720 (step 708). ENB 720 then sends an E-RAB modify response message and a UL NAS Transport message to MME 721 (steps 707 and 709). The update bearer response message is then passed to the SGW 722, and then to the PGW 102 (see steps 710 and 711). Finally, the PGW 102 sends a CCR message to PCRF 110 which then responds with a CCA message back to PGW 102 (steps 712 and 713).

With regards to all of the signal messages going back and forth between the components in FIGS. 1-3 and 5-7, it is noted that the QoS code NNN that is entered by the end user is utilized by both PGW 102 and 126 to set up the desired QoS. Thus, PGW 102 and 120 are able to set up the desired QoS based on instructions from the AS. This allows either of the end users to enter a numerical or character based code that is associated with a particular QoS that may be desirable for a particular video conference phone call, application, session, etc. In the event when QoS is not agreed by one party then default QoS is implement.

As is described above, the end user may enter the code in an application provided by the service provider or a third party application running on the mobile phone. For example, the end user may download a third party QoS application on the mobile phone. The third party application may have a display that provides a user with various options for selecting QoS. For example, a third party application may have various levels of QoS (e.g., low QoS, medium QoS and high QoS). The third party application may also have various manners in which the QoS may be implemented such as per session, per phone call, per communication application, etc. This may allow an end user to select a particular QoS level for a desired period of time or based on a particular application that the end user is running. The various QoS levels and a requested time for the desired QoS may be associated with a fee that is to be paid to the service provider.

For example, the third party app may show various options for the low, medium and high QoS. The high QoS, may be considered a boost from the current user's medium level of QoS value. This high QoS value may specify a certain dollar amount per minute or per session for increasing the quality of the user's experience. Thus, if the user is going to enter a significant business call, and wants a high QoS for a high quality streaming of video and audio, the user may pay a certain fee to the service provider per minute of the phone call. The service provider may alternately charge a fee per video call or per session.

In another example, if it is determined that the user's battery life or data usage plan is low (e.g. battery is below a threshold percentage, or data plan only has a predetermined amount of data left before the user goes over the monthly allowance), then the user may wish to select a lower level QoS then is currently being used. By selecting the lower level QoS (e.g., lower data rate/lower quality), the user is less likely to go over the data plan allotted for his monthly allowance, and is less likely to drain the battery of the mobile phone. The user may also obtain benefits from the service provider by a reduced charge on his data plans since the user is utilizing a lower quality service from the service provider.

In general, the end user will be allowed to dynamically select a QoS level for various audio and video applications running on the mobile phone. This selection is either manually entered by a specific numerical code, or alternatively could be automatically controlled by a third party application. For example, the third party application may monitor the user's preferences, battery life of the mobile phone, data plan usage remaining for the month, and other parameters in order to optimize the user's experience without incurring significant cost to the user while providing a seamless experience.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device comprising:
a transceiver that receives data from a network, and transmits data to the network;
an input interface that receives input data from a user of the device;
a processor coupled to a non-transient computer readable medium, the computer readable medium including programming instructions which cause the processor to:
receive an input from the input interface of a selection of a desired quality of service (QoS) requested by the user, for a communication session through the network;
append an alpha-numerical code corresponding to the desired QoS to a session initiation protocol (SIP) invite message relating to set-up of the communication session; and
transmit the SIP invite message including the appended alpha-numerical code to the network by the transceiver, to control the network to look up the desired QoS in a network table based on the alpha-numerical code, in order to provide the desired QoS during communication between the mobile device and another device via the communication session through the network, and wherein the processor is further configured to append the alpha-numerical code adjacent to a phone number of the other device within the SIP invite message.

2. The mobile device of claim 1, wherein the alpha-numerical code is transmitted to the network in the SIP invite message prior to communication between the mobile device and the other device.

3. The mobile device of claim 1, wherein the alpha-numerical code is transmitted to the network in the SIP re-invite message during communication between the mobile device and the other device.

4. The mobile device of claim 1, wherein the processor transmits the SIP invite message including the appended alpha-numerical code through the network directly to a service provider of the mobile device.

5. The mobile device of claim 1, wherein the processor transmits the SIP invite message including the appended alpha-numerical code to a service provider of the mobile device through a third party application.

6. A method for an application server controlling mobile device communication over a network, the application server including a processor, the method causing the application server to:
receive a SIP invite message from the mobile device including an alpha-numerical code appended to the SIP invite message, the alpha-numerical code indicating a desired quality of service (QoS) requested by a user of the mobile device;
extract the alpha-numerical code from the SIP invite message;
compare the extracted alpha-numerical code to plurality of alpha-numerical codes in a database, each of the alpha-numerical codes corresponding to a different level of QoS;
generate instructions based on a match between the alpha-numerical code and one of the alpha-numerical codes in the database; and
send the instructions to an element of the network to provide the desired QoS during communication between the mobile device and another device, and
wherein the alpha-numerical code is appended adjacent to a phone number of the other device within the SIP invite message.

7. The method of claim 6, where the method causes the application server to:
extract the alpha-numerical code from the SIP invite message by extracting an alphanumeric code appended to a web address.

8. The method of claim 6, where the method causes the application server to:
instruct another server to demand the desired QoS during establishment of the SIP session.

9. The method of claim 8, wherein the instructions instruct the other server to request the desired QoS from another application server of the other device.

10. The method of claim 6, where the method causes the application server to:
automatically determine the desired QoS and associated alpha-numerical code based on a QoS mode selected by the mobile device.

11. An application server device comprising:
a transceiver that receives data from a network, and transmits data to the network;
a processor coupled to a non-transient computer readable medium, the computer readable medium including programming instructions which cause the processor to:
receive a SIP invite message from a mobile device through the network, the SIP invite message including an alpha-numerical code appended to the SIP invite message, the alpha-numerical code indicating a desired quality of service (QoS) requested by a user of the mobile device;
extracting the alpha-numerical code from the SIP invite message;
compare the extracted alpha-numerical code to plurality of alpha-numerical codes in a database, each of the alpha-numerical codes corresponding to a different level of QoS;
generate instructions based on a match between the alpha-numerical code and one of the alpha-numerical codes in the database; and
configure, in response to the instructions, communication between the mobile device and another device to provide the desired QoS indicated by the alpha-numerical code, and
wherein the alpha-numerical code is appended adjacent to a phone number of the other device within the SIP invite message.

12. The application server device of claim 11, wherein the processor configures the communication between the devices by sending an instruction to another sever to instruct a policy control device to demand the desired QoS on behalf of the requesting mobile device.

13. The application server device of claim 11, wherein the processor configures communication between the mobile device and the other device based on instructions received from a third party application managing the QoS of the mobile device based on preferences selected by the user of the mobile device.

14. The application server device of claim 13, wherein the instructions are based on at least one of battery usage of the mobile device, data usage of the mobile device, an application being executed by the mobile device, or a QoS mode indicated by the mobile device.

15. The application server device of claim 11, including a memory device storing the database indicating the relationship between a plurality of alpha-numerical codes and a plurality of respective QoS levels.

16. The mobile device of claim 1, wherein the alpha-numerical code is received from the user through the input interface.

17. The mobile device of claim 1, wherein the processor is further configured to append the alpha-numerical code in a portion of the SIP invite message known to other network devices.

18. The application server of claim 11, wherein the processor is further configured to instruct other network devices connected to the network to demand desired QoS indicated by the alpha-numerical code.

* * * * *